Figure 6:
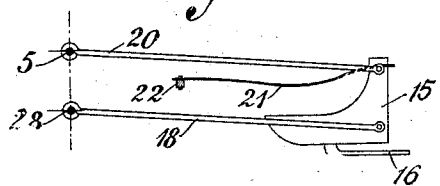

No. 891,054.
PATENTED JUNE 16, 1908.
O. N. FRANKMAN.
MACHINE FOR CUTTING OFF THE TOPS OF BEETS AND THE LIKE ROOTS.
APPLICATION FILED MAR. 23, 1906.
2 SHEETS—SHEET 1.
Fig. 1.
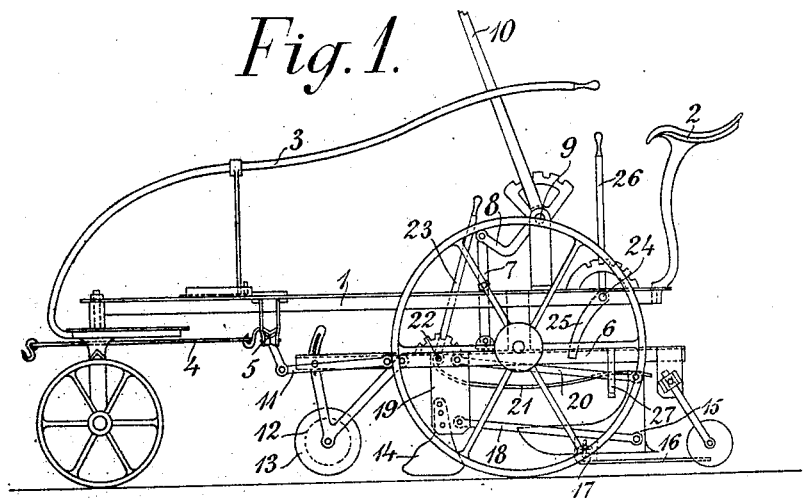
Fig. 2.
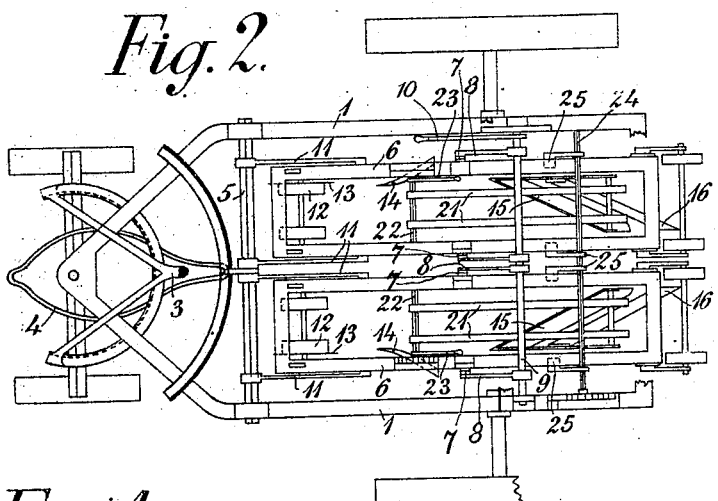
Fig. 4.
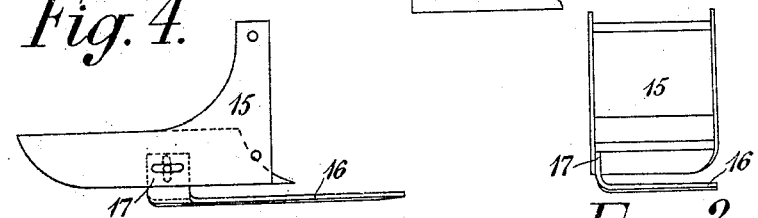
Fig. 3.
Fig. 5.
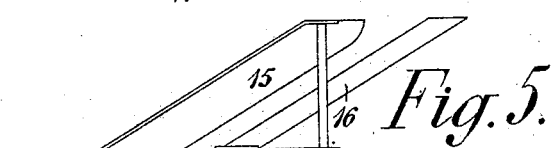
WITNESSES:
F. H. Logan
W. H. Berrigan
INVENTOR,
OLOF NILSSON FRANKMAN,
by Ivan Oldenmeel
Attorney.

UNITED STATES PATENT OFFICE.

OLOF NILSSON FRANKMAN, OF MARIEBERG, SWEDEN.

MACHINE FOR CUTTING OFF THE TOPS OF BEETS AND THE LIKE ROOTS.

No. 891,054.          Specification of Letters Patent.          Patented June 16, 1908.

Application filed March 23, 1906. Serial No. 307,578.

*To all whom it may concern:*

Be it known that I, OLOF NILSSON FRANKMAN, estate manager, citizen of the Kingdom of Sweden, residing at Marieberg, Sweden, have invented a new and useful Machine for Cutting off the Tops of Beets and the Like Roots; and I do hereby declare the following to be a full, clear, and exact description of the same.

This invention relates to a machine for cutting off the tops of growing beets and the like roots, especially sugar-beets. The task required from the machine consists in dividing each root at such a height below the beginning of the leaf-crown, that the green part of the root, the so-called top, shall be sharply cut away together with the leaves. The part of the beet remaining in the ground will thus yield a product suitable for the demands of the sugar factories, and the top with its leaves, if kept free from earth and stones during the cutting off and picking up, will furnish a very valuable by-product suitable for cattle-feeding.

In considering the above-mentioned problem, one meets difficulties, especially because the sugar-beets grow differently, with sometimes only the leaf-crown and sometimes greater or smaller parts of the root above earth. Neither this fact nor the unavoidable irregularities of the ground should, however, prevent my machine from dividing each beet as accurately as demanded, whether the beets be large or small and have a more or less copious leaf-crown, and despite the fact, that the beets do not stand evenly in their rows. When two or more rows of beets are to be treated simultaneously by the same machine, such treatment should always be practicable (and by my machine is practicable), though the intervals of the rows may vary at the different working-places.

Wholly satisfactory work can be accomplished by my new machine, which, unlike other machines, will leave the severed tops with the leaf-crowns sitting thereon in an upright position as if still growing, so that said tops shall remain clean, and can afterwards easily be raked together by mechanical or hand-power. The good work performed by the machine is owing to its preferred peculiar construction, comprising two or more main parts partly independent of each other, and also to the particular construction of the working parts and their connections with other parts.

The accompanying drawing illustrates two forms of my new machine.

Figure 7:
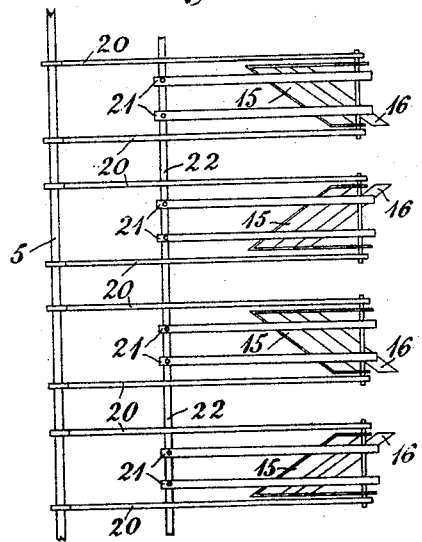
Figure 8:
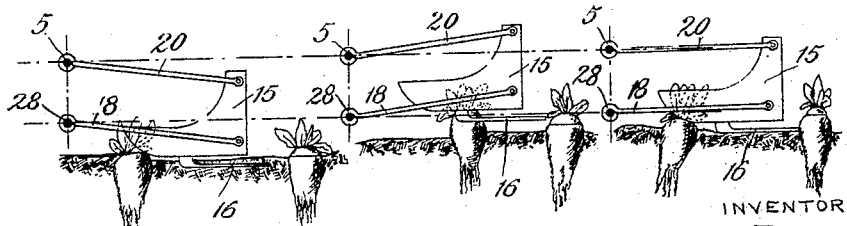

Figure 1 shows a machine in side-view; Fig. 2 is a plan view thereof; Figs. 3, 4 and 5 are views of the beet-cutting plane respectively in rear, lateral and plan; Figs. 6 and 7 illustrate a modification of the device respectively, in lateral and plan view, and Fig. 8 is a view, showing by successive diagrams, the action of the beet-cutting planes to properly sever differently disposed beets growing in a field having an irregular surface.

The machine shown in Figs. 1-5, comprises a four-wheeled drag-carriage and one or more top-cutting machines drawn thereby and running each on wheels of its own and situated below the frame of the drag-carriage and connected therewith by means of a pulling - device, whereby each of these main-parts (the drag-carriage and the top-cutting machine) is able to take a position independent, in height, of the other part. When two or more top-cutting-machines are drawn by one drag - carriage (in the drawings two are shown), they may be placed side by side, so that the distance between the top-cutting machines can be varied according to the intervals existing between the rows of beets to be cut. The machine is strong, cheap and works quickly.

The frame of the drag-carriage, marked 1, carries at its rear a seat 2, wherefrom the driver can direct the entire machine by means of a long steering-rod 3, forked in front and sliding along a curved rail. The hind-part of the rod is cut away in Fig. 2, as well as the rear bar of the drag-carriage, for the sake of distinctness. From his seat the driver can easily also make use of several handles or the like, which shall be hereafter described together with the parts to which they belong. The connection of the drag-carriage with the operating machine is effected by means of a frame 4 lying above the front wheel-axle of the carriage, the hind-end of said frame 4 being movably connected, for instance, by means of a hook, with an oscillating bar 5, to which the drag-rods of the operating-machines can be fastened.

Each separate operating-machine includes a rectangular frame 6 with which four small wheels are connected, in such manner that each wheel can be adjusted in height separately, this arrangement permitting each machine to follow a row of beets with two wheels on each side of it, even if the level of the ground be higher at one side than at the other. Each operating-machine can, as a whole, be raised or lowered with respect of the main-frame, by means of two links 7 pivoted to the frame 6 about midway of the length of the machine, and the upper ends of said rods being secured, by means of bent arms 8, to a cross-bar 9 fixed above the machine frame 1, and all movable by means of a handle 10 capable of being locked in various positions, to regulate the distance in height between the frames 1 and 6.

The front part of each frame 6 is connected with the drag-carriage by means of two links 11, one end of each link slidably carried on the cross-axle 5, to be fastened thereon wherever required. By this mode of connection, each operating-machine is permitted to adjust itself automatically in height and to be so adjusted laterally that its lateral intervals can be made to fit the distance between beet-rows. Another advantage resulting from the illustrated structure, is that the frame of the operating-machine in moving forward shall not rise forwardly, and its front pair of wheels will proceed along the level of the ground more steadily. This is very desirable, as one of each pair of wheels 12 is provided with a rotatable circular knife 13 concentric with the wheel, and employed to cut off the extreme leaf-ends on one side of the plants, which might hinder the cutting off of the beet-tops. The leaf-ends severed by knives 13, are brushed aside by the plates 14 connected fixedly with the frame 6, and inclined outwardly. As the object is to prevent obstruction by the protruding leaves at one side of the machine, the knife 13 and the plate 14 might also be substituted by any other parts accomplishing the same purpose in some other way, for instance, by catching round the leaf-crown and bending it to the side.

With the frame 6 is connected the beet-top cutting apparatus which I have termed a "beet-plane" on account of its particular construction and mode of action, and which consists of two connected parts, a slide-shoe 15 and a plane-iron 16. The arrangement of this plane, which is shown in Figs. 3–5, embodies a series of characteristics, each, and all in their mutual connection, advantageous for the proper execution of the task given to the machine.

The "beet-plane", as a whole, is dragged forward during the movement of the machine in a certain position which, I have found, must be maintained notwithstanding the considerable liberty of moving in vertical direction required for the plane owing to the differences in height of the beets. Injurious pulls during the dragging forward must also be avoided, and the friction reduced to the least possible. These demands are met by reason of the peculiar form of the plane illustrated by me, and its position relative to the beet-row, by the mode of connection with the machine-frame 6 adopted, and by a suitable pressure-device. The conditions furthermore necessary for good and regular work are met by a device for counteracting the side pressure, and by a suitable construction of the plane-iron and preferred connection of the same, with the slide-shoe.

The slide-shoe spoken of and designated 15 in the drawings, has the form of part of a cylinder the generators of which are horizontal and placed at an invariable angle with the proceeding direction in the amount of 25–50°. The length of the cylinder, i. e.: the breadth of the beet-plane across the machine, is comparatively great (for instance, 20 c. m.), in order to prevent the slide-shoe 15 from stepping to the side of beets which do not stand precisely in their row or which possess either an unusually full or a very small leaf-crown. The plane-iron 16 has a breadth sufficient to reach even irregularly standing beets, and its edge which is situated somewhat lower than its back, is parallel to and at a certain distance below and behind the under-side of the slide-shoe. The distance between the edge and the lower part of the slide-shoe can be varied; the plane-iron being fixed on the slide-shoe adjustably both in the height and laterally (as shown in Fig. 4) and the plane can thus be adjusted according to the differences in size and number of leaves of different sorts of beets or for cutting off more or less of the tops. The plane-iron is fastened to the inner side of the slide-shoe by means of a bent-plate-piece 17 (Fig. 4) which mode of fastening in connection with the cylindrical form of the slide-shoe, and the position of the latter at an angle with the proceeding direction, will prevent the accumulation of earth, stones and leaf-parts in front of the plane. If the plane-iron were fastened to the hind-edge of the slide-shoe or to both ends or to the middle of it, or if its position were at a right angle with the beet-row, much accumulation, especially at the place of fastening of the plane-iron, might easily occur, whereas through the method adopted stones and earth are carried away outside, and the leaves will be able to pass between the slide-shoe and the plane-iron together with exceptionally accompanying beet-tops, if they do not come in the way of the plane-iron and are not cut off.

The angle-position of the plane-iron with regard to the direction of movement causes the beets to be cut sharply through with accuracy and without splitting, in such a way that part of the root itself would be removed together with the top and leaves. Owing to its edge standing lower than the back, the plane can work itself better down in the ground, and the iron is prevented from gliding above the beet and certainly cuts its way through it, and this position of the plane-iron also causes the edge to preserve its sharpness longer than if the iron were fastened horizontally and at a right angle to the beet-row. It must be remembered also that the work of the plane-iron partly takes place in the ground, as shown in the sketch Fig. 8 (which also shows the slide-shoe proceeding on the surface of the ground) and only when meeting with beets standing up above the ground will slide on the leaf-crown which had best be rolled completely down previously. This movement, necessarily very irregular, is facilitated by the cylindrical form of the slide-shoe, which also is favored by the comparatively small friction, and by preventing jerks upon the plane.

For the connection of the beet-plane with the frame of its operating-machine, two pairs of link rods are provided. Each of the drag-rods 18, (pairs of which are shown) is connected at the sides of the hind-edge of the slide-shoe at its lower end, and the front ends of said rods are pivoted upon the arms 19 (Fig. 1) dependent from the frame 6 and which carry the above-named plate 14, whereby the drag-rods 18 are caused to lie very low and almost horizontally. This construction lessens friction and favors liberty of movement, in vertical directions, of the beet-plane. This vertical movement is not obstructed either by the second pair of supporting rods 20 which are pivoted at opposite sides of the hind-end of the slide-shoe at its upper end and extend to the frame 6 itself at a place rather far ahead, whereby these rods also are caused to lie almost horizontally; their principal work is to support or stay the beet-plane so that, notwithstanding its movements up and down, it is able to retain the proper position both in regard to each single beet and to the beet-row as a whole.

During its movement up and down the beet-plane is preferably pressed down against the ground with suitable strength and steadiness. This pressure is produced by means of horizontally disposed springs 21 (Figs. 1 and 6), the hind-ends of which bear against the upper edge of the slide-shoe, and the front-ends of which are connected with an oscillatory shaft 22 rather far ahead on the frame 6. By means of a handle 23, the spring-pressure can both be regulated to the strength desired and also be quickly changed by the driver when passing large holes or lumps. When the handle 23 is locked, the pressure will remain almost constant owing to the relatively great length of the spring, notwithstanding the movements of the beet-plane up and down. The springs only being kept strained when in use, they will be able to keep their elasticity for a long time.

The angle-position of the beet-plane with regard to the proceeding direction, produces a strong side-pressure, especially while the beet-tops are being cut off. In order to prevent each operating-machine from being forced out to the side, that is away from the beet-row, which might easily happen because it is merely connected with the drag-carriage by means of the movable drag-rods at its front-part, a revolving shaft 24 is disposed in the frame 1 of the carriage, on which shaft two angle-irons 25 are fastened which can be turned down on the outer side of each frame 6 when the shaft is rotated by means of the lock-handle 26. The operating-machine will then be prevented from being displaced to the side and will get a steady move.

In case it might be required of the beet-planes to take part in the adjusting of the frames 6 with regard to the frame 1 caused by the rods 7, this may be obtained by hooks 27 catching round the plane when the frame is somewhat raised, or by a similar device.

Another detail of construction of the machine is shown in Figs. 6 and 7, wherein the frames 6 with their wheels are omitted, and each beet-plane 15, 16 is connected directly with rods or links 18, 20 upon cross-shafts 5 (before described and shown) and 28, both suitably carried by the drag-carriage, the shaft 28 being preferably disposed directly underneath the shaft 5. The arrangement of the parts for regulating the position and movement of the planes may be that before shown or may be suitably modified.

Having thus described my invention, what I claim, and desire to secure by Letters Patent of the United States, is:

1. In a machine for cutting off the tops of beets, a wheeled frame, a beet-cutting device disposed below said frame, and a rearwardly extending flexible connection from said frame and means for exerting pressure upon said beet cutting device.

2. In a machine for cutting off the tops of beets, a wheeled main body, a wheeled frame adjustably connected with the main body, a beet cutting device disposed below the frame, and rearwardly extending flexible connections from said frame to said beet-cutting device.

3. In a machine for cutting off the tops of beets, a wheeled frame, a beet-cutting device, disposed below said frame, rearwardly-extending flexible connections from said frame to said beet-cutting device, and a spring for pressing the last-named device downwardly and away from the frame.

4. In a machine for cutting off the tops of beets, a wheeled frame, a beet-cutting device connected with said frame so as to have rising and falling movements and comprising a sliding shoe and a plane iron connected therewith and disposed below and loosely connected with said frame, and a long spring pressing firmly downwardly against the beet cutting device and at a point above the working center of said device.

5. In a machine for cutting off the tops of beets, a wheeled main body, a wheeled frame adjustably connected with the main body at a plurality of points, handles for effecting desired adjustment at each said points, a beet-cutting device disposed below said frame, and rearwardly-extending flexible connections from said frame to said beet-cutting device.

6. In a machine for cutting off the tops of beets, a wheeled main body provided with a cross bar 5, a wheeled frame adjustably connected with the main body, bars 11 loosely connected with said frame and having forward ends slidably surrounding the aforesaid cross bar, and a beet-cutting device disposed below and loosely connected with said frame.

7. In a machine for cutting off the tops of beets; a wheeled frame, a beet-cutting device disposed below and loosely connected with said frame, a knife connected with and driven by a wheel of said frame, and a device for brushing away the leaves cut by the knife.

8. In a machine for cutting off the tops of beets, a wheeled frame, a beet-cutting device disposed below and loosely connected with said frame, a circular knife secured to one of the wheels of said frame, and a depending inclined plate for brushing away the leaves cut by the knife.

9. In a machine for cutting off the tops of beets, a wheeled frame, a beet-cutting device disposed below said frame and a pair of arms loosely connecting said beet-cutting device with said frame, so as to have rising and falling movements, said device comprising a slide shoe 15 and a plane 16 parallel with the slide shoe and situated rearwardly of and below the latter, and means for adjusting the plane vertically and horizontally relatively to the slide shoe.

10. In a machine for cutting off the tops of beets, a wheeled frame, a beet-cutting device disposed below the frame, and a pair of arms loosely connecting said beet-cutting device with said frame, so as to have rising and falling motions, said beet-cutting device comprising a slide shoe 15, and a lateral horizontally-disposed plane adjustably secured to the slide shoe at a single point only.

11. In a machine for cutting off the tops of beets, a wheeled frame, a beet-cutting device disposed below said frame, rearwardly-extending flexible connections from said frame to said beet-cutting device, and a long spring having one end connected with the frame and having its other end pressing the beet-cutting device downwardly.

12. In a machine for cutting off the tops of beets, a wheeled main body, a wheeled frame carried below the main body, a beet-cutting device disposed below said frame, a pair of arms 25 depending from the main body and engaging the wheeled frame at its sides, and means for lowering and raising said pair of arms as desired.

In testimony whereof, I have signed my name to this specification in the presence of two subscribing witnesses.

OLOF NILSSON FRANKMAN.

Witnesses:
E. WEHTJE,
E. HEDENSKOG.